United States Patent
Budhia et al.

(10) Patent No.: US 10,333,293 B2
(45) Date of Patent: *Jun. 25, 2019

(54) METHOD FOR INCREASING PAD EFFICIENCY AND ROBUSTNESS

(71) Applicant: WiTricity Corporation, Watertown, MA (US)

(72) Inventors: Mickel Bipin Budhia, Auckland (NZ); Chang-Yu Huang, Auckland (NZ); Michael Le Gallais Kissin, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/605,569

(22) Filed: May 25, 2017

(65) Prior Publication Data

US 2018/0174734 A1 Jun. 21, 2018

Related U.S. Application Data

(60) Provisional application No. 62/437,009, filed on Dec. 20, 2016, provisional application No. 62/436,944, filed on Dec. 20, 2016.

(51) Int. Cl.
*H02J 7/00* (2006.01)
*H02H 7/20* (2006.01)
(Continued)

(52) U.S. Cl.
CPC .............. *H02H 7/20* (2013.01); *B60L 53/12* (2019.02); *B60L 53/30* (2019.02); *B60L 53/305* (2019.02);
(Continued)

(58) Field of Classification Search
CPC ........ H01F 27/24; H01F 27/25; B60L 11/182; H02J 5/005
(Continued)

(56) References Cited

U.S. PATENT DOCUMENTS

2008/0121462 A1* 5/2008 Pucek ..................... E06C 1/39
182/12
2011/0214678 A1* 9/2011 Zhang ..................... A61F 2/20
128/848
(Continued)

FOREIGN PATENT DOCUMENTS

DE 102006048829 A1 4/2008
JP 2014082339 A 5/2014
(Continued)

OTHER PUBLICATIONS

International Search Report and Written Opinion—PCT/US2017/064279—ISA/EPO—dated Mar. 12, 2018.

*Primary Examiner* — Paul Dinh
(74) *Attorney, Agent, or Firm* — Colby Nipper

(57) ABSTRACT

Systems and methods are described that increase pad efficiency and robustness. These systems and methods balance magnetic flux density in ferrite strips in a WEVC pad to reduce heat produced in high-flux areas of the ferrite strips. Aspects include controlled spacing between ferrite strips of a WEVC pad and intentional gaps located within high-flux areas in the strips. The sizes of the intentional gaps are determined in relation to the size of the spacing between the strips. In addition, ribs are disposed between the strips and connected to a backplate to provide structural rigidity and robustness to the pad.

30 Claims, 9 Drawing Sheets

(51) Int. Cl.
  *H02J 7/02* (2016.01)
  *H02J 50/12* (2016.01)
  *H01F 38/14* (2006.01)
  *H01F 27/32* (2006.01)
  *H02J 50/70* (2016.01)
  *H01F 27/255* (2006.01)
  *H01F 27/26* (2006.01)
  *B60L 53/12* (2019.01)
  *B60L 53/30* (2019.01)
  *B60L 53/34* (2019.01)
  *H02J 50/80* (2016.01)

(52) U.S. Cl.
  CPC ............ *B60L 53/34* (2019.02); *H01F 27/255* (2013.01); *H01F 27/26* (2013.01); *H01F 27/324* (2013.01); *H01F 38/14* (2013.01); *H02J 7/025* (2013.01); *H02J 50/12* (2016.02); *H02J 50/70* (2016.02); *H02J 50/80* (2016.02)

(58) Field of Classification Search
  USPC ........................................................ 320/108
  See application file for complete search history.

(56) References Cited

U.S. PATENT DOCUMENTS

| | | | |
|---|---|---|---|
| 2013/0302082 A1* | 11/2013 | Sikorski | E02F 3/3631 403/33 |
| 2014/0247007 A1 | 9/2014 | Liao et al. | |
| 2015/0077053 A1* | 3/2015 | Stamenic | H02J 7/0042 320/109 |
| 2015/0302984 A1 | 10/2015 | Kurs et al. | |
| 2016/0028240 A1 | 1/2016 | Boys et al. | |
| 2016/0049232 A1 | 2/2016 | Covic et al. | |
| 2016/0190814 A1 | 6/2016 | Budhia et al. | |
| 2016/0204618 A1 | 7/2016 | Samuelsson et al. | |
| 2016/0285317 A1* | 9/2016 | Maniktala | H02J 50/12 |
| 2016/0285318 A1 | 9/2016 | Maniktala | |
| 2017/0092419 A1* | 3/2017 | Abdolkhani | H01F 38/14 |
| 2017/0227704 A1* | 8/2017 | Li | G02B 6/0088 |
| 2017/0370379 A1* | 12/2017 | Wilfley | F04D 29/622 |
| 2018/0174745 A1 | 6/2018 | Percebon et al. | |

FOREIGN PATENT DOCUMENTS

| | | |
|---|---|---|
| WO | 2014122125 A1 | 8/2014 |
| WO | 2016131767 A1 | 8/2016 |

* cited by examiner

METHOD FOR INCREASING PAD EFFICIENCY AND ROBUSTNESS

RELATED APPLICATIONS

This application claims the benefit of and priority to U.S. Provisional Appl. Ser. No. 62/437,009, filed on Dec. 20, 2016, and U.S. Provisional Appl. Ser. No. 62/436,944, filed on Dec. 20, 2016, the disclosures of which are incorporated herein by reference in their entirety.

FIELD

The present disclosure relates generally to wireless power transfer, and more specifically to wireless electric vehicle charging (WEVC) systems.

BACKGROUND

Wireless power transfer is the transmission of electrical energy from a power source to an electrical load without the use of conductors, such as interconnecting wires. Wireless power is a generic term that refers to a number of different power transmission technologies that use time-varying electric, magnetic, or electromagnetic fields. In wireless power transfer, a wireless transmitter connected to a power source transmits field energy across an intervening space to one or more receivers, where it is converted back to an electric current and then used. Wireless transmission is useful to power electrical devices in cases where interconnecting wires are inconvenient, hazardous, or are not possible. However, current wireless power transfer systems suffer from inefficiencies related to controlling magnetic flux.

SUMMARY

Systems and methods are described that increase pad efficiency and robustness. These systems and methods balance magnetic flux density in ferrite strips in a power-transfer structure, such as a wireless electric vehicle charging (WEVC) pad used for wirelessly charging an electric vehicle, to reduce heat produced in high-flux areas of the ferrite strips. Aspects include controlled spacing between ferrite strips of the WEVC pad and intentional gaps located within high-flux areas in the strips. The sizes of the intentional gaps are determined in relation to the size of the spacing between the strips. In addition, ribs are disposed between the strips and connected to a backplate to provide structural rigidity and robustness to the pad.

DETAILED DESCRIPTION

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiver element" to achieve power transfer.

In an ideal case, ferrite used in a power-transfer structure, such as an inductive power transfer pad for vehicles, referred to herein as a "vehicle pad," would be a solid isotropic slab with no imperfections, such as a monolithic ferrite slab. Manufacturing such large pieces of ferrite, however, is impractical and even if available, difficult to use. Generally, a vehicle pad in an electric vehicle is subjected to severe acceleration (e.g., bumps), which can cause the pad to bend, thereby stressing and cracking the brittle ferrite.

Because of these problems, ferrite slabs are generally constructed of many individual pieces. Due to dimensional tolerances in the manufacturing process, the pieces generally do not fit together tightly, resulting in small air gaps. These small gaps cause magnetic flux to travel undesired paths, which can result in hot spots. Some other hot spots can result from a structural effect of the whole structure of the pad that generally causes flux density to be extremely high in an outer strip due to overhanging portions of a coil of the pad. Some hot spots can also result from a high concentration of magnetic flux generated proximate to an edge of the coil or between two coils of the pad. The hot spots can damage neighboring materials, such as insulation located between the ferrite and a coil of the pad. In some cases, the insulation (e.g., plastic layer) can melt and distort. This can result in the coil physically contacting the ferrite, which can spark a fire in the pad and potentially harm people in the vehicle.

Thus, certain pad designs may have hot spots, which reduce efficiency and increase damage to neighboring materials. In addition, certain pad designs may be susceptibility to bending, which can crack the ferrite.

Figure 1:
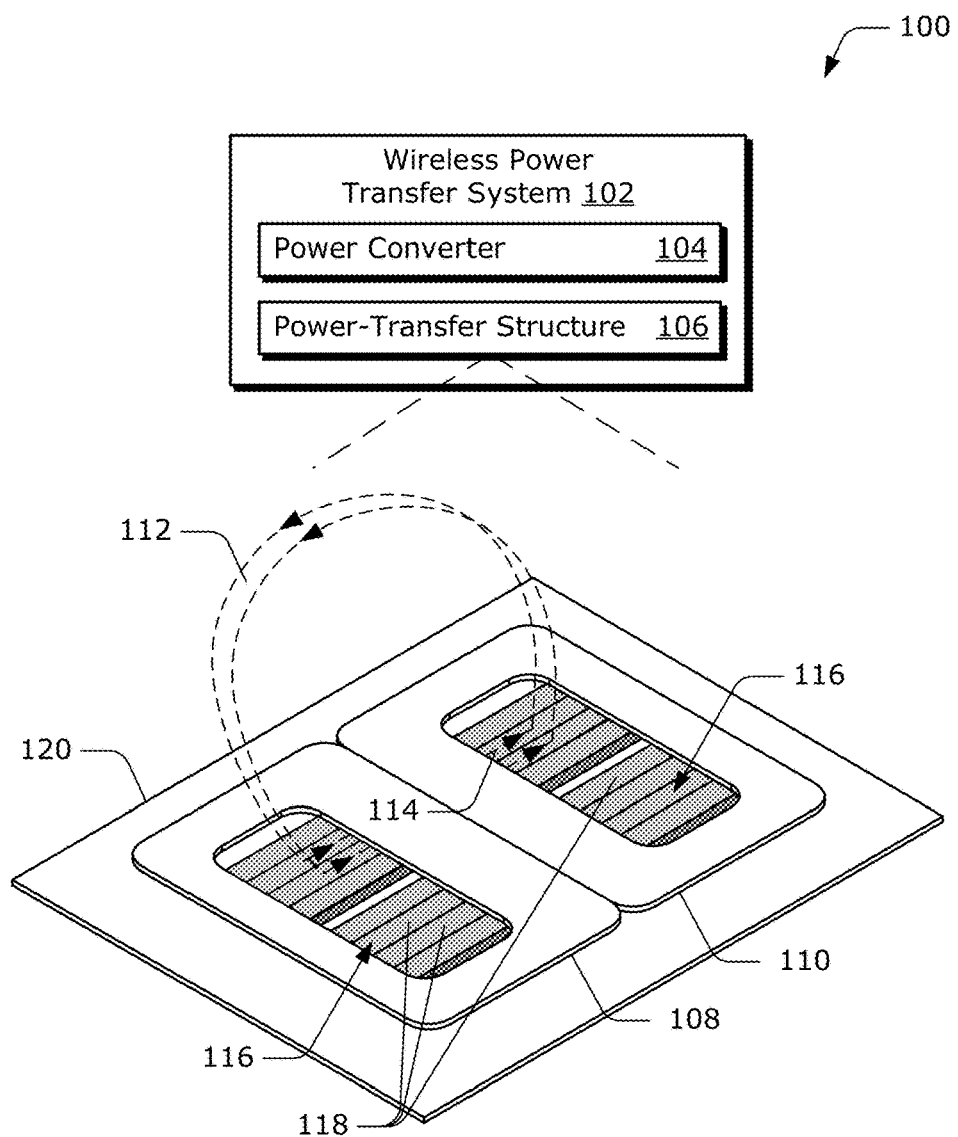
FIG. 1 illustrates an example implementation of a wireless power transfer system, in accordance with some implementations.

FIG. 1 illustrates an example implementation 100 of a wireless power transfer system 102. The wireless power transfer system 102 transfers energy from a power source to a remote system. The wireless power transfer system 102 includes a power converter 104 and a power-transfer structure 106. The power converter 104 converts power from a power source to a suitable operating frequency for wireless high-power transfer via the power-transfer structure 106, or to convert power received via the power-transfer structure 106 into a suitable voltage level of a load, e.g., battery.

The power-transfer structure 106 (also referred to herein as a "pad") wirelessly transmits or receives power. The power-transfer structure 106 can include a combination of at least a coil, a ferrite layer, and a backplate. In some aspects, the power-transfer structure 106 can also include a housing to house the coil, the ferrite layer, and the backplate. In the illustrated example, the power-transfer structure 106 includes a Double-D (DD) topology, which includes two electrically conductive coils 108, 110 disposed proximate to one another. The coils 108, 110 are configured to generate a magnetic field 112 by running current through the coils 108, 110. Generally, the current in the center of the pad runs in the same direction. For example, the current in the coil 108 may run in a clockwise direction while the current in the coil 110 may run in a counterclockwise direction. In this way, a high magnetic field strength is generated in the center of the pad (e.g., may arch in a horizontal direction between the poles/openings above the pad). While the power-transfer structure 106 is shown as including separate coils, DD coil topologies can include two separate conductors or a single conductor wound to form a DD coil topology (e.g., as described with respect to FIG. 8), and multiple turns are contemplated in various applications. Other coil topologies are also applicable to the techniques described herein, including a multi-coil topology (e.g., Bi-Polar, Double-D plus quadrature (DDQ)) or a single coil topology (e.g., circular coil).

Generally, magnetic flux 114 induced by the magnetic field passes through ferrite 116 disposed proximate to the coils. In the illustrated example, the magnetic flux 114 passing through the ferrite 116 is substantially orthogonal to the coils 108, 110 in the center of the pad, resulting in the flux 114 passing in a straight line through the length of the pad. In an ideal case, a monolithic ferrite slab (100% of volume is used for ferrite) would be used. However it may not be practical to make or use such slabs in large sizes (e.g., for vehicles) using current manufacturing techniques or due to cost. For example, ferrite is generally produced using a process that involves sintering, e.g., compacting and forming a solid mass of material by heat or pressure without melting it to the point of liquefaction. Through the sintering process, however, the ferrite can shrink unevenly, creating challenges with respect to manufacturing tolerances. Further, ferrite is a brittle ceramic material, which is susceptible to cracking when exposed to bending stresses, such as those caused by vibration. Cracks can substantially change the flux paths through the ferrite, which can result in non-deterministic behaviors for the pad. In one example, after a duration of time in a moving vehicle, the ferrite can crack in random locations, which can result in poor performance and/or overheating and insulation damage.

Because monolithic slabs are not practical, the ferrite 116 can be formed in pieces that are tightly packed together into bars, e.g., strips 118. The strips 118 are arranged in a direction relative to a polarization between the poles of the DD coil structure. To facilitate this ferrite arrangement, the strips are positioned substantially parallel to the magnetic field generated by the coils 108, 110 to channel the flux such that flux lines pass straight through the strips 118. Because each individual strip is formed via the sintering process, they are not all entirely square on the ends. Rather, the ends can have a curved or other complex shape. While the ends of the strips 118 can be ground, grinding adds cost to the manufacturing process and can still result in gaps up to 0.1 millimeter (mm), which can have a significant effect.

For example, a small gap (e.g., <0.1 mm) between two adjacent portions of a strip 118 significantly increases reluctance and causes the flux to concentrate on lower reluctance paths. This concentration of flux results in high-flux density areas, resulting in high power loss that generates heat. The coils 108, 110 also affect flux density in particular areas of the strips 118, such as areas over which the coils 108, 110 hang and areas between the coils 108, 110. Accordingly, even a perfect set of strips 118 include high-flux density areas that generate heat. Extreme heat can damage surrounding materials, such as an insulating layer, which can melt and distort. Heat generated also reduces end-to-end efficiency.

In addition, in the context of a vehicle pad, for example, it is desirable to make the pad as thin as possible, e.g., less than 15 mm thick, while still protecting the brittle ferrite strips 118 from cracking or breaking. To provide some structural support, the strips 118 are mounted to a backplate 120. However, the backplate 120 can also be susceptible to bending based on its own thinness.

Figure 2:
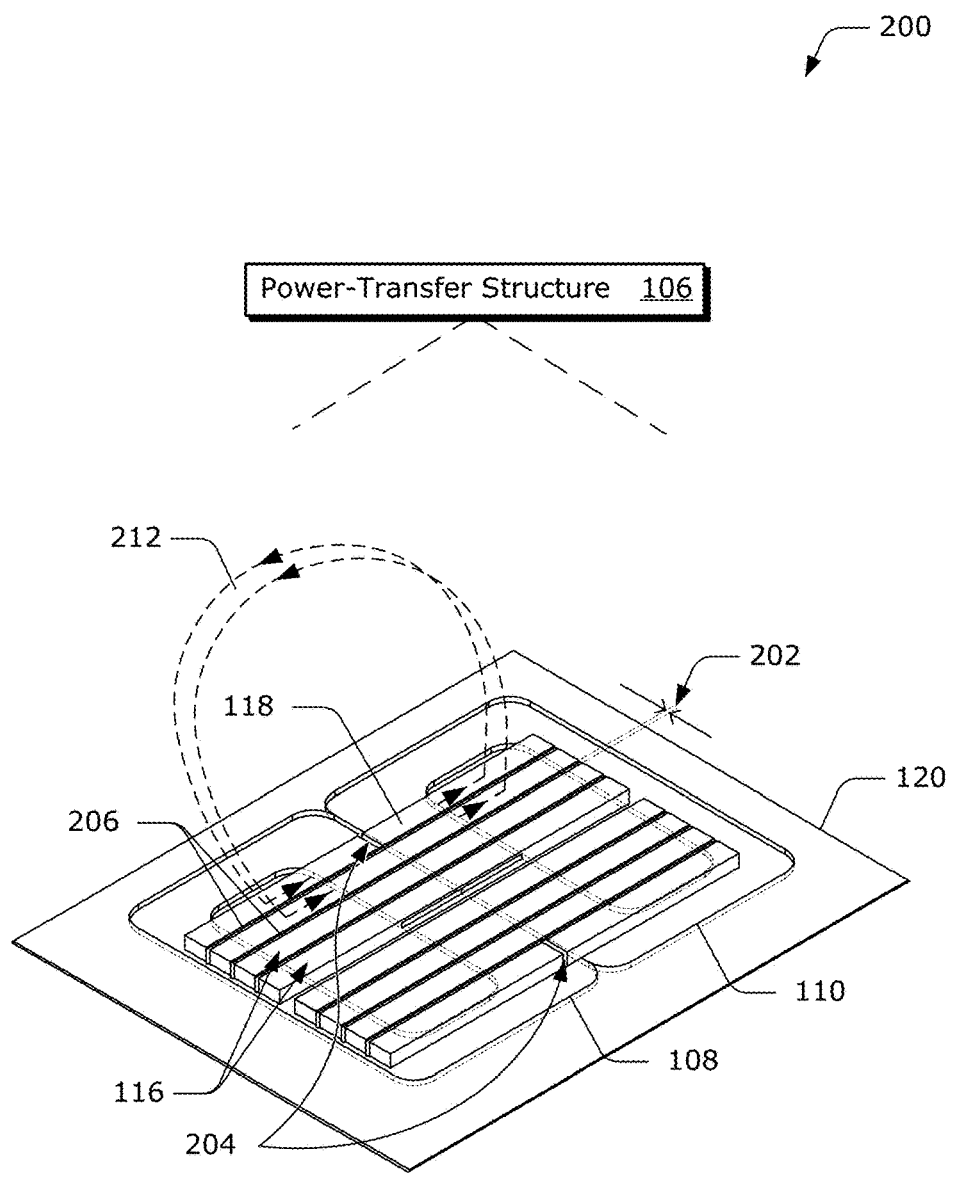
FIG. 2 illustrates an example implementation of a power-transfer structure from FIG. 1 in more detail.

FIG. 2 illustrates an example implementation of the power-transfer structure 106 from FIG. 1 in more detail. Here, the power-transfer structure 106 (e.g., Double-D pad) includes the strips 118 spaced apart by a predefined distance 202. In addition, at least some of the strips 118 include an intentional gap 204 in the strip 118. The distance 202 between the strips 118 and the intentional gap 204 in the strips 118 are each relatively larger than any type of gaps or spaces due to manufacturing tolerances and material flaws associated with the strips 118.

The gap 204 is substantially perpendicular to a longitudinal axis of the strip 118, such that the gap 204 is substantially perpendicular to the magnetic field 112. The gap 204 is placed in a high-flux density area of the strip 118 to increase reluctance along the strip 118. In addition, to increase robustness and rigidity of the pad, and further protect the brittle ferrite 116 from bending stresses, ribs 206 can be disposed between the strips 118 and mounted to the backplate 120. Further discussion of these and other aspects is included in more detail below.

Figure 3:
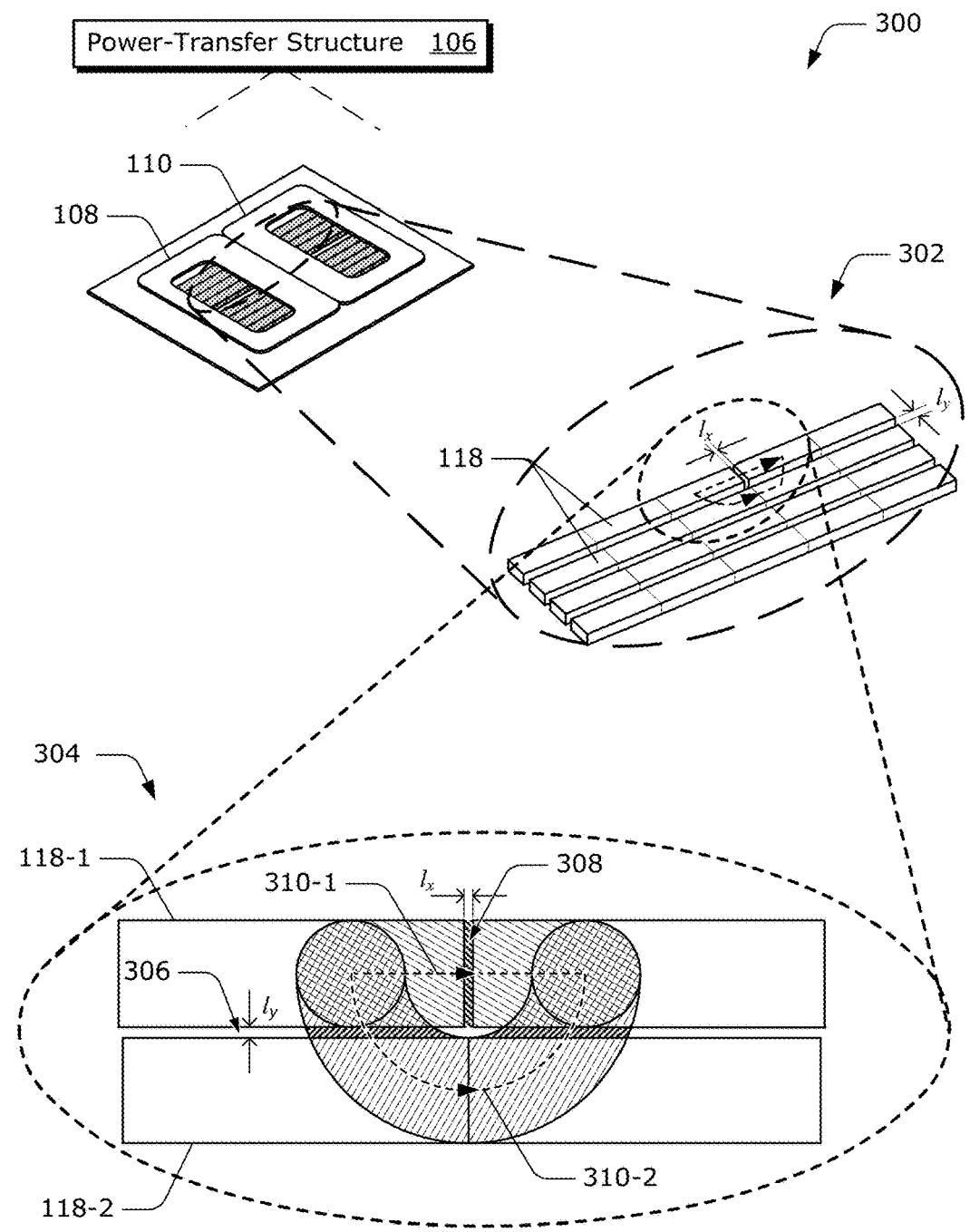
FIG. 3 illustrates example implementation of a structure for increasing efficiency in a power-transfer structure.

FIG. 3 illustrates an example implementation 300 of a structure for increasing efficiency in a power-transfer structure 106. For example, the power-transfer structure 106 is illustrated with an expanded view 302 of a portion of the ferrite strips 118, and an expanded view 304 including strips 118-1, 118-2. In the expanded view 304, the strip 118-1 is spaced apart from the strip 118-2 by a space 306 having a predefined distance $l_y$. In addition, the strip 118-1 includes an intentional gap 308 having a size $l_x$.

In the illustrated example, the intentional gap 308 has a width of a magnitude that increases a reluctance of a flux path along the strip 118-1 and balance flux density between the strip 118-1 and the strip 118-2. In aspects, the intentional gap 308 includes a predefined size that is based on the space 306 to increase the reluctance along first path 310-1, which causes some of the flux (e.g., hashed areas) to move along second path 310-2 into the neighboring strip 118-2. The intentional gap 308 is sized relative to the spacing 306 to balance the flux density between the strips 118-1, 118-2. This counteracts the structural effect of the whole structure that generally results in the flux density being extremely high in the outer strip (e.g., strip 118-1), due to overhanging portions of the coils 108, 110. For example, the overhanging portions of the coils 108, 110 contribute a portion of the magnetic field to the outer strip, causing additional flux to pass through the outer strip. Particular areas affected by the overhanging portions of the coils 108, 110 include areas of the outer strip located under the coils 108, 110 and/or between the coils 108, 110. By balancing the flux density between the strips, power loss and hot spots are reduced, which reduces the chances of damage to neighboring materials.

Because it is approximately 2000 times easier for flux to pass through ferrite than through air, the space 306 between the strips 118-1, 118-2 causes additional flux from the overhanging coils to concentrate in the strip 118-1, resulting in a high-flux density area, which creates heat. Compared with the second path 310-2, the first path 310-1 has a substantially lower reluctance. By inserting the gap 308 in the strip 118-1 at the high-flux density area, the reluctance in the strip 118-1 is increased. However, by increasing the reluctance along the first path 310-1 to a value that is similar to that of the reluctance along the second path 310-2, a portion of the flux passing through the strip 118-1 passes instead to the neighboring strip, strip 118-2, along the second path 310-2. In at least some implementations, the size $l_x$ of the gap 308 is within 2 mm of the distance $l_y$ of the space 306. Both the gap 308 and the space 306 are larger than gaps due to dimensional tolerances of manufacturing the ferrite 116. Accordingly, the gap 308 includes a predefined size effective to balance the flux density between the strips 118-1, 118-2.

Inserting the gap 308 into the outer strip to increase a corresponding reluctance counteracts the structural effect of the flux concentrating in the outer strip. Accordingly, the relationship between the gap 308 and the space 306 is such that the reluctance along the second path 310-2 is less than the reluctance along the first path 310-1, but the reluctance for the entire outer strip, strip 118-1, is relatively higher than the reluctance for the entire neighboring interior strip, strip 118-2.

Figure 4:
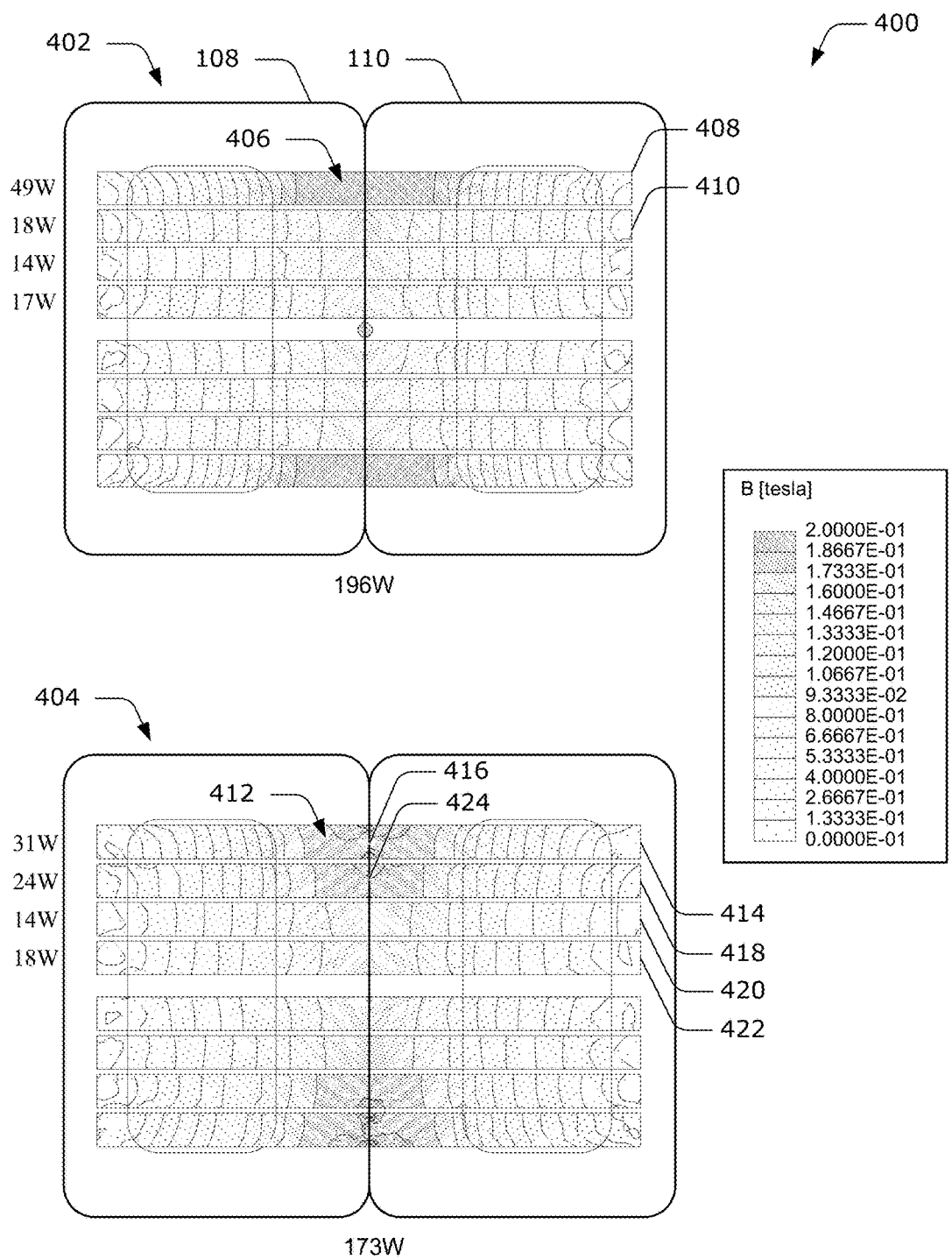
FIG. 4 illustrates example implementations of power loss diagrams of a Double-D (DD) pad design.

FIG. 4 illustrates example implementations 400 of power loss diagrams of a Double-D (DD) pad design. In particular, the implementations 400 include a comparison of power loss between a DD pad 402 (upper diagram) with spacing between ferrite strips and a new DD pad 404 (lower diagram) with both spacing between ferrite strips and a gap in each outer strip. The dotted areas represent power loss, which causes heating. Dense dotting represents high power loss, which gradually decreases down to sparse dotting that represents low power loss. For simplicity, the discussion herein focuses on one side (e.g., upper half) of each pad 402, 404, which are mirrored on an opposing side (e.g., lower half). Accordingly, each described feature can also be implemented in a corresponding location on the other side of the pad 402, 404.

As illustrated in the pad 402, power loss represented by flux density is concentrated in an area 406 located near a center of outer strip 408, in part based on an overhanging portion of the coils 108, 110 providing additional flux to the outer strip 408. For instance, the flux density in area 406 is over 0.2 tesla, whereas a neighboring interior strip 410 has a highest-flux density at approximately 0.14 tesla. By comparison, the new pad 404 has relatively lower flux density in area 412 (similar to area 406 in pad 402) located near the center of outer strip 414. The flux density is substantially lower in the area 412 of the new pad 404 when compared to the area 406 of the pad 402 because of an appropriately sized intentional gap 416 located in the middle of the outer strip 414, which increases the reluctance of the outer strip 414 and causes some of the flux to pass from the outer strip 414 to the neighboring strip 418.

The gap 416 substantially reduces the flux density in the outer strip 414 in comparison to the flux density in the outer strip 408 of the pad 402, which does not include any such gap. For example, in the pad 402, the power loss in the outer strip 408 is 49 watts (W), whereas the power loss in the outer strip 414 of the pad 404 is 31 W. Accordingly, the gap 416 in the outer strip 414 of the pad 404 results in a 37% reduction in power loss in the outer strip 414, compared with that of the pad 402. Further, overall power loss of the pad 402 is measured at 196 W, whereas the overall power loss of the pad 404 is measured at 173 W, which is a reduction of about 12% caused via inclusion of gaps in the outer strips. In implementations, the gaps may affect coupling between a base pad and a vehicle pad, such as by reducing coupling by approximately 1%, which is essentially negligible. While the example implementations are described in relation to specific values or measurements, these values or measurements are described for purposes of illustration only and are not to be construed as limiting.

In some implementations, additional intentional gaps can be utilized in the interior strips, such as strips 418, 420, 422 to balance the flux throughout the pad. For example, gaps can be placed in areas of relatively highest-flux density in each strip. In the new pad 404, a gap 424 can be placed in the middle of the strip 418, which increases the reluctance along the strip 418 and causes some of the flux to pass from the strip 418 to the strip 420, further reducing the flux density in the middle of the strip 418. To avoid increasing the flux density in the area 412 of the strip 414, the gap 416 can be enlarged such that the gap 416 is larger than the gap 424 to balance the flux densities between the strips. Accordingly, the outer strip can have a relatively large gap and the interior strips can have additional gaps that are progressively smaller in a direction toward a center of the pad, e.g., progressively smaller in each strip from the outer strip to the innermost strip. In at least one implementation, locations of the intentional gaps can be in similar locations in each strip or can be in different relative locations in each strip.

Further, multiple intentional gaps can be implemented in an individual strip. For example, in pad designs having two coils that are separated by a distance, the high-flux density areas may not be located in the middle of the strips, but may be located under each coil. In such designs, an individual strip can include multiple gaps, such as a first gap located under one coil and a second gap located under the other coil, where each gap is placed in the high-flux density areas along the strip. In this way, the flux density in those particular areas is reduced and balanced with one or more neighboring strips.

As one example, by including a 1.0-2.0 mm gap in the ferrite strips in a DD pad, the flux density above the coils is reduced by approximately 5%, in comparison to a DD pad without the gaps. This spacing is for example only, other spaces can be used, such as those higher than manufacturing flaws of the ferrite tiles. Flaws often include cracks or edge inconsistencies on the order of 0.01 to 0.2 mm spaces of more than 0.2, or some multiple of the flaw size, are effective to reduce the peak flux density. Smaller spaces, such as those closer to the size of the flaws can also be used, but these smaller spaces are less robust due to the flaws. Accordingly, by constructing the pad with gaps in the ferrite strips, the peak flux density in proximity of the coils is reduced. This also reduces the chances of heating a foreign metal object above a temperature limit, and decreases the chances of harm to people or nearby materials.

In a circular pad design, the fluxes are inherently balanced. The circular pad design, for instance, includes a structure having a single circular coil topology with ferrite strips that extend lengthwise radially from a common point. In aspects, the ferrite strips are spaced apart from the common point. To further improve the circular pad design, however, intentional gaps or spaces can be used to prevent flux from passing to neighboring strips. Accordingly, rather than causing flux to pass to neighboring strips, as in the DD design, gaps are placed in the ferrite strips included in the circular pad design to counteract effects caused by material flaws and manufacturing tolerances, which can cause flux to pass to a neighboring strip. In at least some aspects, an intentional gap can be included between two portions of a target strip at a location corresponding to a gap caused by a material flaw or manufacturing tolerance in the target strip. In addition, the neighboring strip can also include an intentional gap in a similar relative location (e.g., between two portions of the neighboring strip) as the gap in the target strip. By including gaps in both the target strip and the neighboring strip, the reluctance of the flux path in each strip is increased and balanced. Consequently, these intentional gaps prevent the flux from passing from the target strip to the neighboring strip, or from the neighboring strip to the target strip. In some aspects, a space, such as space 306 in FIG. 3, can be placed between neighboring strips to increase the reluctance of the flux path from one strip to a next strip and prevent the flux from passing from the one strip to the next strip or vice versa.

In a circular coil with spaced apart ferrite pieces, for example, a same magnetic field strength caused by ampere turns in the circular coil may result in a lower peak flux density inside the ferrite, and also may result in a lower peak flux density around the ferrite, when compared to a solid ferrite slab. Further, the peak flux density proximate to the coil is also reduced in comparison to the solid ferrite slab. Reducing the flux density in this way reduces heat produced in foreign metal objects that are affected by the magnetic field generated by the coils.

The intentional gaps in the strips of the pad can also reduce a peak flux density that is generated in areas (e.g., air) directly above a primary coil or directly below a secondary coil of the WEVC pad. Reducing the peak flux density in these areas also decreases the likelihood of encountering a hazardous situation at least because heat produced in a foreign metal object affected by the magnetic field is limited based on the reduced peak flux density.

Figure 5:
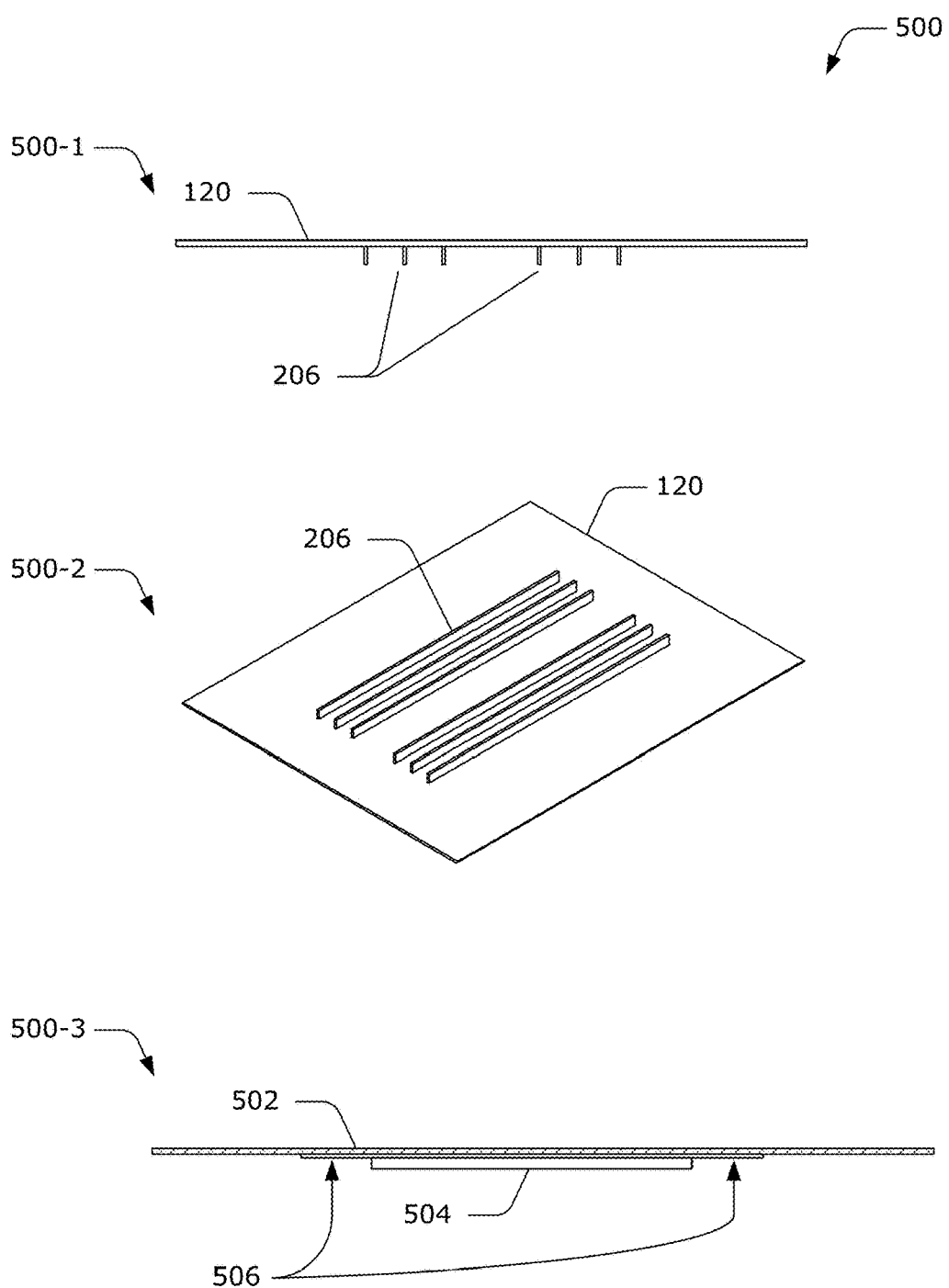
FIG. 5 illustrates an example implementation of a rib structure for increasing pad robustness of a magnetic power-transfer structure.

FIG. 5 illustrates an example implementation 500 of a rib structure for increasing pad robustness of a power-transfer structure. The example implementation 500 includes different views 500-1, 500-2, 500-3 of the backplate 120 connected to multiple ribs 206. Due to the coils in the pad, fasteners generally cannot easily be used in the middle of the pad to secure the middle of the pad to an object, such as a car chassis 502. For this reason, the backplate 120 is used to provide structural rigidity to the pad. However, the backplate 120 is still susceptible to bending based on its thinness. Accordingly, the ribs 206 are included on the backplate 120 to add additional rigidity to the pad.

The ribs 206 can be formed from any of a variety of different materials, such as heat-conducting, non-magnetic materials. Some examples include aluminum, tin, zinc, titanium, copper, and so on. The ribs 206 are configured to add structural rigidity to the pad and also act as a heat sink. In implementations, the ribs 206 are configured to be positioned between the ferrite strips (e.g., strips 118-1, 118-2 of FIG. 3) of the pad. For example, a rib 206 can be disposed within the space 306 from FIG. 3, along the length of the strips 118-1, 118-2. The ribs 206 include a height that is equal to or less than a height of the ferrite strips. Thus, the ribs 206 add strength and rigidity to the pad to prevent bending, without adding thickness to the pad. In addition, an insulating layer can be included between each rib 206 and each neighboring ferrite strip to prevent physical contact between the ribs and the ferrite strips.

In an example, the ribs 206 are formed from aluminum. By placing aluminum ribs between the ferrite strips, the distance $l_y$ of the space between the strips can be relatively greater for a same reluctance as a relatively shorter distance $l_y$ of the space without the aluminum ribs. This is because gas (e.g., air) has an extremely high reluctance as compared to aluminum or other metallic material.

In the view 500-3, a pad 504 is attached to the car chassis 502 via connection points 506. Notice, however, that the connection points 506 are exterior to the pad 504, and no connection points are included in the middle of the pad 504. As described above, the coils included in the pad 504 prevent fasteners from being used in the middle of the pad 504 without damaging the coils.

Because the ribs 206 add structural rigidity, a thinner backplate 120 can be used to reduce manufacturing costs in comparison to conventional techniques. Further, the ribs 206 can act as heat sinks to reduce the heat generated in the pad 504.

Example Procedures

The following discussion describes example procedures for increasing pad efficiency and robustness. The example procedures may be employed in the implementation 100 of FIG. 1, the system 700 of FIG. 7, and/or any other suitable environment. The steps described for the various procedures can be implemented automatically and independent of user interaction. The orders in which operations of these procedures are shown and/or described are not intended to be construed as a limitation, and any number or combination of the described procedure operations can be combined in any order to implement a method, or an alternate method.

Figure 6:
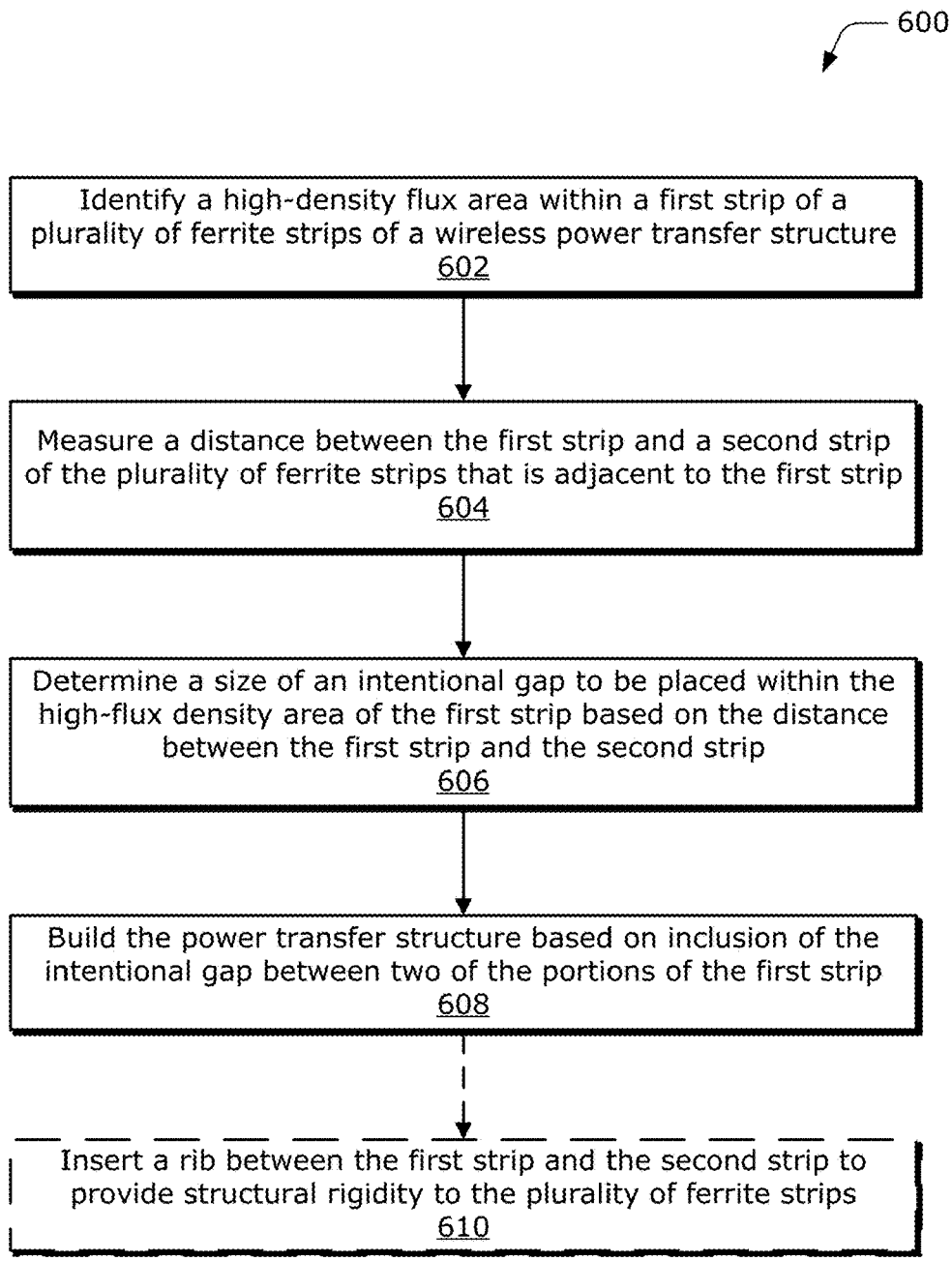
FIG. 6 depicts a flow diagram of an example process for increasing pad efficiency and robustness, in accordance with some implementations.

FIG. 6 depicts a flow diagram of an example process 600 for increasing pad efficiency and robustness, in accordance with some implementations. At 602, a high-density flux area is identified within a first strip of a plurality of ferrite strips of a wireless power transfer pad. At 604, a distance is measured between the first strip and a second strip of the plurality of ferrite strips that is adjacent to the first strip. At 606, a size of an intentional gap, such as a gap between two portions of the first strip, to be placed within the high-flux density area of the first strip is determined based on the distance between the first strip and the second strip. The size of the intentional gap is determined to be relatively larger than manufacturing tolerances and material flaws associated with the first strip. Further, the intentional gap size is determined based on a target level of reluctance increase of a flux path along the first strip. In addition, the first strip includes a longitudinal axis that is substantially perpendicular to the intentional gap.

At 608, the power-transfer structure is built based on inclusion of the intentional gap in the high-flux density area within the first strip. For instance, the power-transfer structure 106 can be built such that the intentional gap is included between two portions of the first strip. Additional intentional gaps can be included within one or more additional strips, as described above. In aspects, the intentional gap is placed in the high-flux density area of the first strip to increase a reluctance of a flux path along the first strip and balance flux density between the first strip and the second strip.

Optionally at 610, a rib may be inserted between the first strip and the second strip to provide structural rigidity to the plurality of ferrite strips. In an example, the rib can be inserted prior to measuring the distance between the first strip and the second strip. Further, one or more additional ribs can each be disposed between pairs of strips of the plurality of ferrite strips. In certain implementations, the rib is connected to a backplate, which is connected to the plurality of ferrite strips. The rib structurally reduces a likelihood of the backplate bending, which improves protection of the ferrite strips in comparison to traditional techniques. In addition or in the alternative, the rib can act as a heat sink to reduce heat generated in either the first strip or the second strip, or both.

Example Wireless Power Transfer System

The following discussion describes example wireless power transfer systems for increasing pad efficiency and robustness. The systems described below can include the above-described implementations described respect to FIGS. 1-5 and can be used to employ the above-described methods described with respect to FIG. 6. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 7:
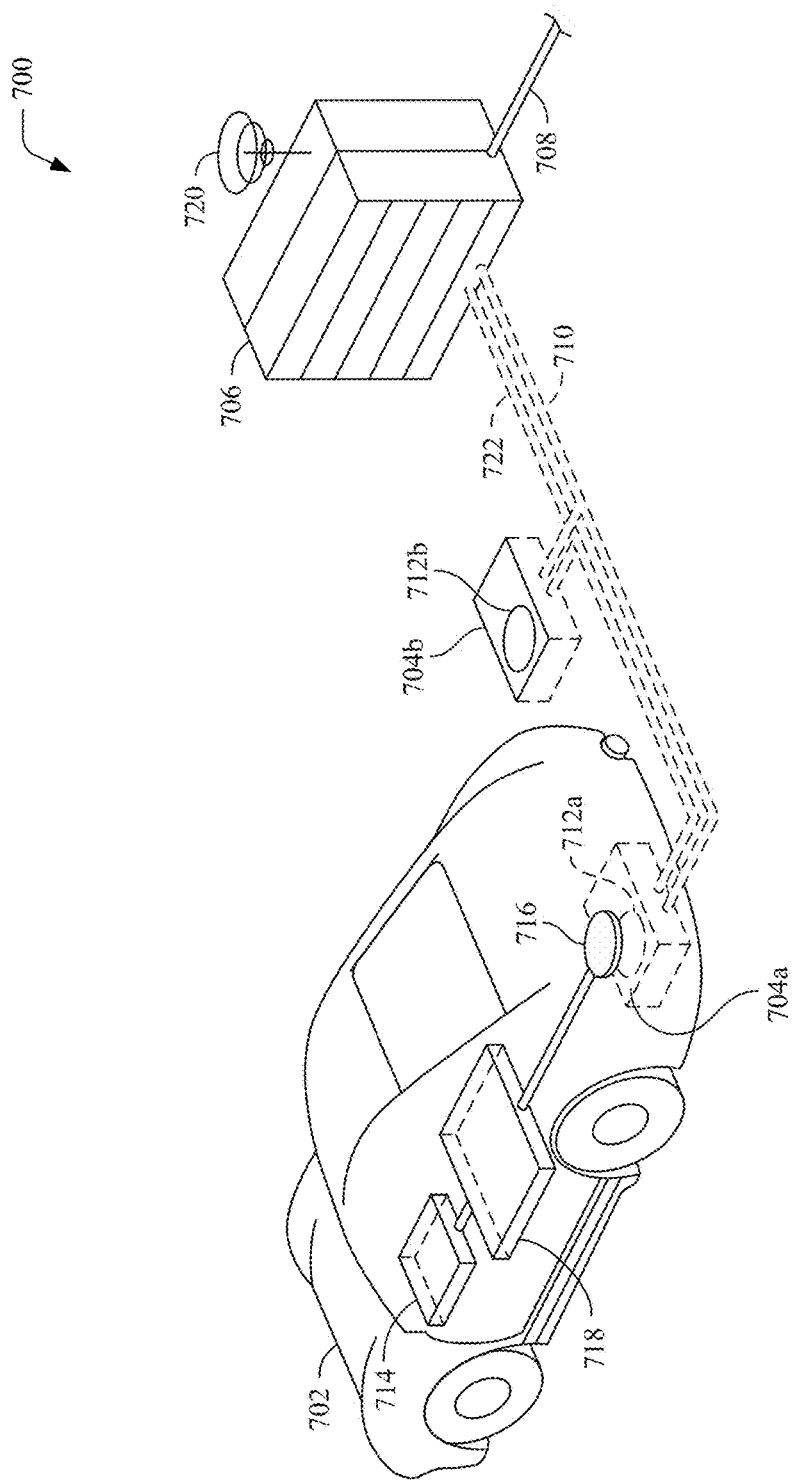
FIG. 7 illustrates an example implementation of a wireless power transfer system for charging an electric vehicle.

FIG. 7 is a diagram of an exemplary wireless power transfer system 700 for charging an electric vehicle, in accordance with some exemplary implementations. The wireless power transfer system 700 enables charging of an electric vehicle 702 while the electric vehicle 702 is stationary so as to efficiently couple with a base wireless charging system 704a. Spaces for two electric vehicles are illustrated in a parking area to be parked over corresponding base wireless charging systems 704a and 704b. In some implementations, a local distribution center 706 may be connected to a power backbone 708 and configured to provide an alternating current (AC) or a direct current (DC) supply through a power link 710 to the base wireless charging systems 704a and 704b. Each of the base wireless charging systems 704a and 704b also includes a base power-transfer structure 712a and 712b, respectively, for wirelessly transferring power. In some other implementations (not shown in FIG. 7), base power-transfer structures 712a or 712b may be stand-alone physical units and are not part of the base wireless charging system 704a or 704b. An example of base power-transfer structures 712a or 712b includes the power-transfer structure 106 as described with reference to FIGS. 1-3.

The electric vehicle 702 may include a battery unit 714, an electric vehicle power-transfer structure 716, and an electric vehicle wireless charging system 718. The electric vehicle wireless charging system 718 and the electric vehicle power-transfer structure 716 constitute the electric vehicle wireless charging system. In some diagrams shown herein, the electric vehicle wireless charging system 718 is also referred to as a vehicle charging unit (VCU). The electric vehicle power-transfer structure 716, such as the wireless power-transfer structure 106, may interact with the base power-transfer structure 712a, for example via a region of the electromagnetic field generated by the base power-transfer structure 712a.

In some exemplary implementations, the electric vehicle power-transfer structure 716 may receive power when the electric vehicle power-transfer structure 716 is located in an electromagnetic field produced by the base power-transfer structure 712a. The field may correspond to a region where energy output by the base power-transfer structure 712a may be captured by the electric vehicle power-transfer structure 716. For example, the energy output by the base power-transfer structure 712a may be at a level sufficient to charge or power the electric vehicle 702. In some cases, the field may correspond to a "near-field" of the base power-transfer structure 712a. The near-field may correspond to a region in which there are strong reactive fields resulting from the currents and charges in the base power-transfer structure 712a that do not radiate power away from the base power-transfer structure 712a. In at least one example, the near-field may correspond to a region that is within about $1/2\pi$ of a wavelength of a frequency of the electromagnetic field produced by the base power-transfer structure 712a distant from the base power-transfer structure 712a, as will be further described below.

electric vehicle power-transfer structure 716 may be aligned with the base power-transfer structure 712a and, therefore, disposed within a near-field region simply by the electric vehicle operator positioning the electric vehicle 702 such that the electric vehicle power-transfer structure 716 is sufficiently aligned relative to the base power-transfer structure 712a. Alignment may be considered sufficient when an alignment error has fallen below a tolerable value. The operator may, however, be given visual and/or auditory feedback to determine when the electric vehicle 702 is properly placed within a tolerance area for wireless power transfer. The electric vehicle 702 may be positioned by an autopilot system, which moves the electric vehicle 702 until the sufficient alignment is achieved. This may be performed automatically and autonomously by the electric vehicle 702 with or without driver intervention. This may be possible for an electric vehicle 702 that is equipped with a servo steering, radar sensors (e.g., ultrasonic sensors), and intelligence for safely maneuvering and adjusting the electric vehicle. The electric vehicle 702 and/or the base wireless charging system 704a may have functionality for mechanically displacing and moving the power-transfer structures 716 and 712a, respectively, relative to each other to more accurately orient or align them and develop sufficient and/or otherwise more efficient coupling there between.

The base wireless charging system 704a may be located in a variety of locations. As non-limiting examples, some suitable locations include a parking area at a home of the electric vehicle 702 owner, parking areas reserved for electric vehicle wireless charging modeled after conventional petroleum-based filling stations, stoplights, and other locations, such as shopping centers and places of employment, when a vehicle may be stationary for some period of time. Local distribution center 706 may be configured to communicate with external sources (e.g., a power grid) via a communication backhaul 720, and with the base wireless charging system 704a via a communication link 722.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 700 as compared to a wired power transfer system. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 702 may be used as distributed storage devices to stabilize a power grid, a convenient docking-to-grid solution may help to increase availability of vehicles for vehicle-to-grid (V2G) operation. The wireless power transfer system 700 may also provide aesthetical and non-impedimental advantages. For example, there may be no charge columns or cables that may be impedimental for vehicles and/or pedestrians.

As a further explanation of the vehicle-to-grid capability, the wireless power transmit and receive capabilities may be configured to be reciprocal such that either the base wireless charging system 704a can transmit power to the electric vehicle 702 or the electric vehicle 702 can transmit power to the base wireless charging system 704a. This capability may be useful to stabilize the power distribution grid by allowing electric vehicles 702 to contribute power to the overall distribution system in times of energy shortfall caused by over demand or shortfall in renewable energy production (e.g., wind or solar).

Figure 8:
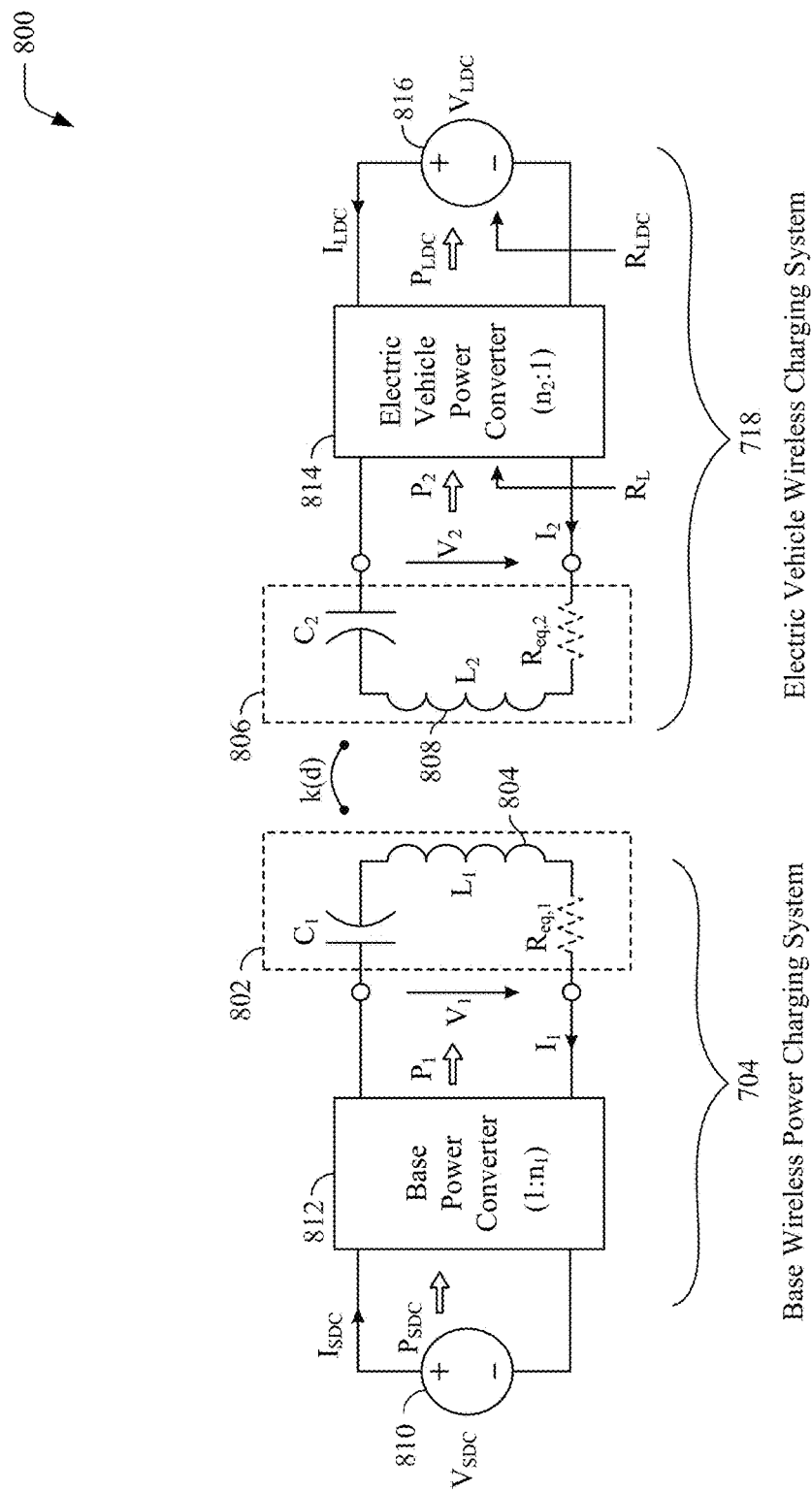
FIG. 8 is a schematic diagram of exemplary components of the wireless power transfer system of FIG. 7.

FIG. 8 is a schematic diagram of exemplary components of a wireless power transfer system 800 similar to that previously discussed in connection with FIG. 7, in accordance with some exemplary implementations. The wireless power transfer system 800 may include a base resonant circuit 802 including a base power-transfer structure 804, such as the power-transfer structure 106, having an inductance $L_1$. The wireless power transfer system 800 further includes an electric vehicle resonant circuit 806 including an electric vehicle power-transfer structure 808, such as the power-transfer structure 106, having an inductance $L_2$. In aspects, capacitively loaded conductor loops (e.g., multi-turn coils—e.g., potentially using Litz wire) are used that form a resonant structure capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power-transfer structure 808 and the base power-transfer structure 804. Using resonant structures for coupling energy may be referred to as "magnetically coupled resonance," "electromagnetically coupled resonance," and/or "resonant induction." The operation of the wireless power transfer system 800 is described herein based on power transfer from the base power-transfer structure 804 to the electric vehicle 702 (not shown in FIG. 8), but is not limited thereto. For example, as discussed above, energy may also be transferred in the reverse direction.

With reference to FIG. 8, a power supply 810 (e.g., AC or DC) supplies power $P_{SDC}$ to a base power converter 812 as part of the base wireless power charging system 704 to transfer energy to an electric vehicle (e.g., electric vehicle 702 of FIG. 7). The base power converter 812 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 812 supplies power $P_1$ to the base resonant circuit 802 including tuning capacitor $C_1$ in series with base power-transfer structure 804 to emit an electromagnetic field at the operating frequency. In some aspects, the capacitor $C_1$ may be coupled with the base power-transfer structure 804 in parallel. Tuning may, however, be formed of several reactive elements in any combination of parallel or series topology. The capacitor $C_1$ may be provided to form a resonant circuit with the base power-transfer structure 804 that resonates substantially at the operating frequency. The base power-transfer structure 804 receives the power $P_1$ and wirelessly transmits power at a level sufficient to charge or power the electric vehicle. For example, the level of power provided wirelessly by the base power-transfer structure 804 may be on the order of kilo-watts (kW) (e.g., anywhere from 1 kW to 70 kW, although actual levels may be or higher or lower).

The base resonant circuit 802 (including the base power-transfer structure 804 and tuning capacitor $C_1$) and the electric vehicle resonant circuit 806 (including the electric vehicle power-transfer structure 808 and tuning capacitor $C_2$) may be tuned to substantially the same frequency. The electric vehicle power-transfer structure 808 may be positioned within the near-field of the base power-transfer structure 804 and vice versa, as further explained below. In this case, the base power-transfer structure 804 and the electric vehicle power-transfer structure 808 may become coupled to one another such that power may be transferred wirelessly from the base power-transfer structure 804 to the electric vehicle power-transfer structure 808. The series capacitor $C_2$ may be provided to form a resonant circuit with the electric vehicle power-transfer structure 808 that resonates substantially at the operating frequency. In some aspects, the capacitor $C_2$ may be coupled with the electric vehicle power-transfer structure 808 in parallel. The electric vehicle resonant circuit 806 may, however, be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle power-transfer structures 804 and 808 and the tuning (anti-reactance) capacitors $C_1$ and $C_2$, respectively. The electric vehicle resonant circuit 806, including the electric vehicle power-transfer structure 808 and capacitor $C_2$, receives the power $P_2$ and provides the power $P_2$ to an electric vehicle power converter 814 of the electric vehicle wireless charging system 718.

The electric vehicle power converter 814 may include, among other things, a LF-to-DC converter configured to convert power at an operating frequency back to DC power at a voltage level of a load 816 that may represent the electric vehicle battery unit. The electric vehicle power converter 814 may provide the converted power $P_{LDC}$ to the load 816. The power supply 810, base power converter 812, and base power-transfer structure 804 may be stationary and located at a variety of locations as discussed above. The load 816 (e.g., the electric vehicle battery unit), electric vehicle power converter 814, and electric vehicle power-transfer structure 808 may be included in the electric vehicle wireless charging system 718 that is part of the electric vehicle (e.g., electric vehicle 702) or part of its battery pack (not shown). The electric vehicle wireless charging system 718 may also be configured to provide power wirelessly through the electric vehicle power-transfer structure 808 to the base wireless power charging system 704 to feed power back to the grid or other power supply 810. Each of the electric vehicle power-transfer structure 808 and the base power-transfer structure 804 may act as transmit or receive power-transfer structures based on the mode of operation.

Although not shown, the wireless power transfer system 800 may include a load disconnect unit (LDU) to safely disconnect the electric vehicle load 816 or the power supply 810 from the wireless power transfer system 800. For example, in case of an emergency or system failure, the LDU may be triggered to disconnect the load from the wireless power transfer system 800. The LDU may be provided in addition to a battery management system for managing charging of a battery, or the LDU may be part of the battery management system.

Further, the electric vehicle wireless charging system 718 may include switching circuitry (not shown) for selectively connecting and disconnecting the electric vehicle power-transfer structure 808 to the electric vehicle power converter 814. Disconnecting the electric vehicle power-transfer structure 808 may suspend charging and also may change the "load" as "seen" by the base wireless power charging system 704 (acting as a transmitter), which may be used to "cloak" the electric vehicle wireless charging system 718 (acting as the receiver) from the base wireless charging system 704. The load changes may be detected if the transmitter includes a load sensing circuit. Accordingly, the transmitter, such as the base wireless charging system 704, may have a mechanism for determining when receivers, such as the electric vehicle wireless charging system 718, are present in the near-field coupling mode region of the base power-transfer structure 804 as further explained below.

As described above, during energy transfer towards an electric vehicle (e.g., electric vehicle 702 of FIG. 7), input power is provided from the power supply 810 such that the base power-transfer structure 804 generates an electromagnetic field for providing the energy transfer. The electric vehicle power-transfer structure 808 couples to the electromagnetic field and generates output power for storage or consumption by the electric vehicle 702. In some aspects, the base resonant circuit 802 and electric vehicle resonant circuit 806 are configured and tuned according to a mutual resonant relationship such that they are resonating nearly or substantially at the operating frequency. Transmission losses between the base wireless power charging system 704 and electric vehicle wireless charging system 718 are minimal when the electric vehicle power-transfer structure 808 is located in the near-field coupling mode region of the base power-transfer structure 804 as further explained below.

As stated, an efficient energy transfer occurs by transferring energy via a magnetic near-field rather than via electromagnetic waves in the far-field, which may involve substantial losses due to radiation into the space. When in the near-field, a coupling mode may be established between the transmit power-transfer structure and the receive power-transfer structure. The space around the power-transfer structures where this near-field coupling may occur is referred to herein as a near-field coupling mode region.

While not shown, the base power converter 812 and the electric vehicle power converter 814 if bidirectional may both include, for a transmit mode, an oscillator, a driver circuit such as a power amplifier, a filter and matching circuit, and for a receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 802 and 806 to the base and electric vehicle power converters 812 and 814, respectively. For the receive mode, the base and electric vehicle power converters 812 and 814 may also include a rectifier and switching circuitry.

The electric vehicle power-transfer structure 808 and the base power-transfer structure 804 as described throughout the disclosed implementations may be referred to or configured as "conductor loops," and more specifically, as "multi-turn conductor loops" or coils (e.g., potentially implemented as Litz wire wound to have multiple turns). The base and electric vehicle power-transfer structures 804 and 808 may also be referred to herein or be configured as "magnetic" power-transfer structures. The term "power-transfer structure" is intended to refer to a component that may wirelessly output or receive energy for coupling to another "power-transfer structure."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 802) including a power-transfer structure (e.g., the base power-transfer structure 804 and capacitor $C_1$) as described above. As shown in FIG. 8, inductance may generally be the inductance of the power-transfer structure, whereas, capacitance may be added to the power-transfer structure to create a resonant structure at a desired resonant frequency. Accordingly, for larger size power-transfer structures using larger diameter coils exhibiting larger inductance, the value of capacitance needed to produce resonance may be lower. Inductance may also depend on a number of turns of a coil. Furthermore, as the size of the power-transfer structure increases, coupling efficiency may increase. This is mainly true if the size of both base and electric vehicle power-transfer structures increase. Furthermore, a resonant circuit including a power-transfer structure and tuning capacitor may be designed to have a high quality (Q) factor to improve energy transfer efficiency. For example, the Q factor may be 300 or greater.

As described above, the near-field may correspond to a region around the power-transfer structure in which mainly reactive electromagnetic fields exist. If the physical size of the power-transfer structure is much smaller than the wavelength, inversely proportional to the frequency, there is no substantial loss of power due to waves propagating or radiating away from the power-transfer structure. Near-field coupling-mode regions may correspond to a volume that is near the physical volume of the power-transfer structure, typically within a small fraction of the wavelength. According to some aspects, power-transfer structures, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power-transfer structures (e.g., dipoles and monopoles) or a combination of magnetic and electric power-transfer structures may be used.

Figure 9:
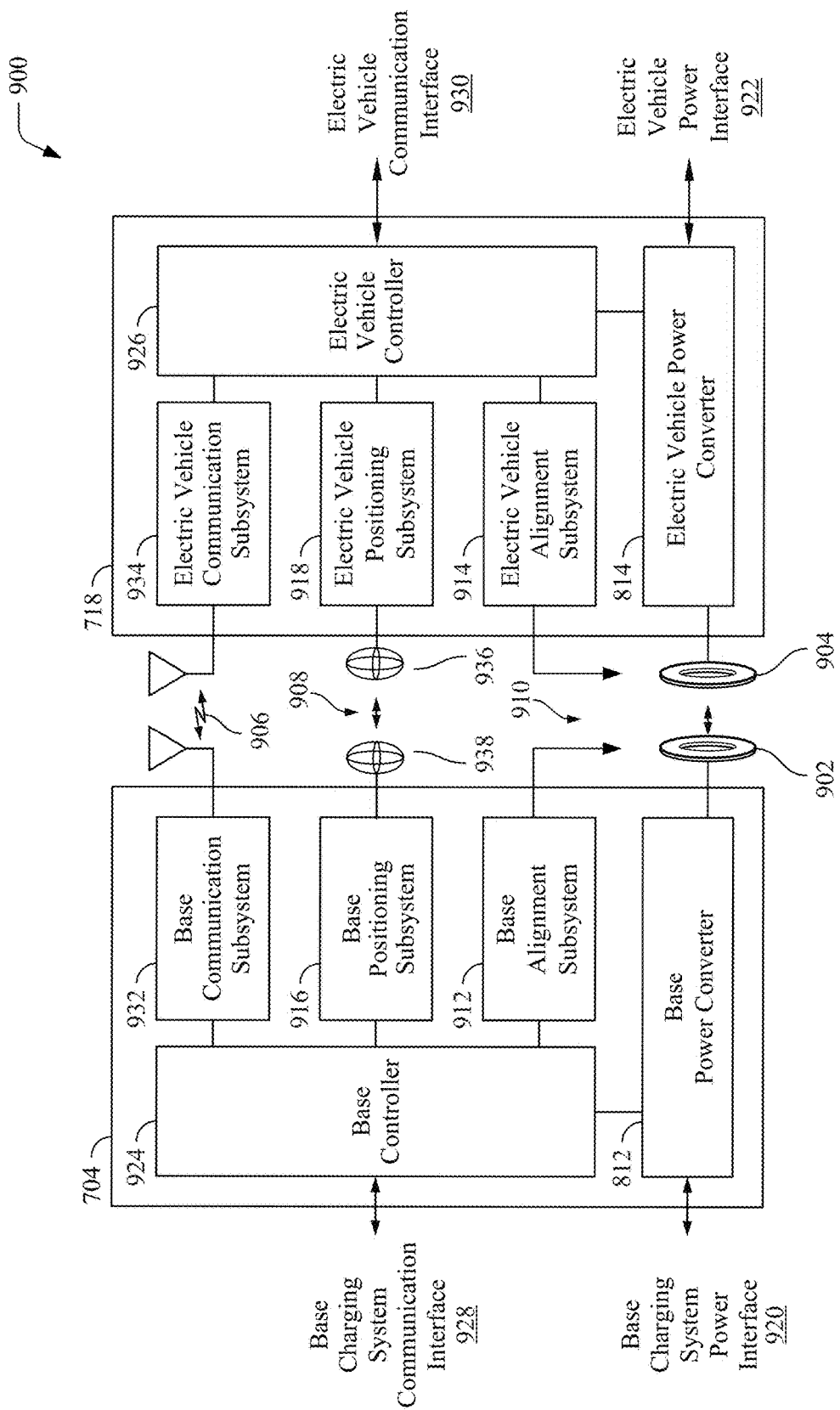
FIG. 9 is a functional block diagram showing exemplary components of the wireless power transfer system of FIG. 7.

FIG. 9 is a functional block diagram showing exemplary components of wireless power transfer system 900, which may be employed in the wireless power transfer system 700 of FIG. 7 and/or may be included as part of the wireless power transfer system 800 of FIG. 8. The wireless power transfer system 900 illustrates a base power-transfer structure 902 and an electric vehicle power-transfer structure 904. In addition, the wireless power transfer system 900 includes a communication link 906; a positioning link 908, using, for example, a magnetic field signal for determining a position or direction; and an alignment mechanism 910 capable of mechanically moving one or both of the base power-transfer structure 902 and the electric vehicle power-transfer structure 904. An example of the base power-transfer structure 902 and/or the electric vehicle power-transfer structure 904 is the power-transfer structure 106 described above with reference to FIGS. 1-3. Mechanical (kinematic) alignment of the base power-transfer structure 902 and the electric vehicle power-transfer structure 904 may be controlled by a base alignment subsystem 912 and an electric vehicle alignment subsystem 914, respectively. The positioning link 908 may be capable of bi-directional signaling, meaning that positioning signals may be emitted by a base positioning subsystem 916 or an electric vehicle positioning subsystem 918, or by both.

As described above with reference to FIG. 7, when energy flows towards the electric vehicle 702, in FIG. 9 a base charging system power interface 920 may be configured to provide power to a base power converter 812 from a power source, such as an AC or DC power supply (not shown). The base power converter 812 may receive AC or DC power via the base charging system power interface 920 to drive the base power-transfer structure 902 at a frequency near or at the resonant frequency of the base resonant circuit 802 with reference to FIG. 8. The electric vehicle power-transfer structure 904, when in the near-field coupling-mode region, may receive energy from the electromagnetic field to oscillate at or near the resonant frequency of the electric vehicle resonant circuit 806 with reference to FIG. 8. The electric vehicle power converter 814 converts the oscillating signal from the electric vehicle power-transfer structure 904 to a power signal suitable for charging a battery via an electric vehicle power interface 922.

The base wireless charging system 704 includes a base controller 924, and the electric vehicle wireless charging system 718 includes an electric vehicle controller 926. The base controller 924 may provide a base charging system communication interface 928 to other systems (not shown) such as, for example, a computer, a base common communication (BCC), a communications entity of the power distribution center, or a communications entity of a smart power grid. The electric vehicle controller 926 may provide an electric vehicle communication interface 930 to other systems (not shown) such as, for example, an on-board computer on the vehicle, a battery management system, other systems within the vehicle, and remote systems.

The wireless power transfer system 900 is illustrated as including a base communication subsystem 932 and an electric vehicle communication subsystem 934 that may include subsystems or modules for specific application with separate communication channels and also for wirelessly communicating with other communications entities not shown in the diagram of FIG. 9. These communications channels may be separate physical channels or separate logical channels. As non-limiting examples, the base alignment subsystem 912 may communicate with the electric vehicle alignment subsystem 914 through the communication link 906 to provide a feedback mechanism for more closely aligning the base power-transfer structure 902 and the electric vehicle power-transfer structure 904, for example via autonomous mechanical (kinematic) alignment, by either the electric vehicle alignment subsystem 914 or the base alignment subsystem 912, or by both, or with operator assistance as described herein.

The electric vehicle wireless charging system 718 may further include the electric vehicle positioning subsystem 918 connected to a magnetic field generator 936. The electric vehicle positioning subsystem 918 may be configured to drive the magnetic field generator 936 with currents that generate an alternating magnetic field. The base wireless charging system 704 may include a magnetic field sensor 938 connected to a base positioning subsystem 916. The magnetic field sensor 938 may be configured to generate a plurality of voltage signals under influence of the alternating magnetic field generated by the magnetic field generator 936. The base positioning subsystem 916 may be configured to receive these voltage signals and output a signal indicative of a position estimate and an angle estimate between the magnetic field sensor 938 and the magnetic field generator 936. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

In some implementations, the positioning error (error in the position estimates) at offsets (distances)<20 cm may be specified to <2 cm, and for distances >20 cm to <1% of distance, e.g., <10 cm at a distance of 1 m and <50 cm at a distance of 5 m, where the distance refers to the horizontal distance between the magnetic centers of the magnetic field generator 936 and the magnetic field sensor 938. The positioning error may refer to the error magnitude (error radius) and, e.g., to the $90^{th}$ percentile of position error statistics. Accordingly, the orientation error (error in the angle estimate) at distances <20 cm may be specified to <2°, and for distances >20 cm to <5°.

Further, the electric vehicle controller 926 may be configured to communicate with electric vehicle onboard systems. For example, the electric vehicle controller 926 may provide, via the electric vehicle communication interface 930, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power-transfer structures 902 and 904. Moreover, electric vehicle controller 926 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 900 may also support plug-in charging via a wired connection, for example, by providing a wired charge port (not shown) at the electric vehicle wireless charging system 718. The electric vehicle wireless charging system 718 may integrate the outputs of the two different chargers prior to transferring power to or from the electric vehicle. Switching circuits may provide the functionality as needed to support both wireless charging and charging via a wired charge port.

To communicate between the base wireless charging system 704 and the electric vehicle wireless charging system 718, the wireless power transfer system 900 may use in-band signaling via base and electric vehicle power-transfer structures 902, 904 and/or out-of-band signaling via communications systems (subsystems 932, 934), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power-transfer structures 904 and 908 may also be configured to act as wireless communication antennas. Thus, some implementations of the base wireless charging system 704 may include a controller (not shown) for enabling keying type protocol on the wireless power path. By keying the transmit power level (amplitude shift keying) at predefined intervals with a predefined protocol, the receiver may detect a serial communication from the transmitter. The base power converter 812 may include a load sensing circuit (not shown) for detecting the presence or absence of active electric vehicle power receivers in the near-field coupling mode region of the base power-transfer structure 902. By way of example, a load sensing circuit monitors the current flowing to a power amplifier of the base power converter 812, which is affected by the presence or absence of active power receivers in the near-field coupling mode region of the base power-transfer structure 902. Detection of changes to the loading on the power amplifier may be monitored by the base controller 924 for use in determining whether to enable the base wireless charging system 704 for transmitting energy, to communicate with a receiver, or a combination thereof.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless power-transfer structure comprising:
one or more coils configured to generate a magnetic field; and
a plurality of ferrite strips configured to provide a path for magnetic flux induced by the magnetic field,
the plurality of ferrite strips including at least a first strip and a second strip adjacent to the first strip,
the first strip being spaced apart from the second strip by a predefined distance, the first strip including an intentional gap disposed between two portions of the first strip at a high-flux-density area within the first strip,
the first strip including a longitudinal axis that is substantially perpendicular to the intentional gap,
the intentional gap having a predefined size that is determined based on the predefined distance between the first strip and the second strip,
the intentional gap causing, based on the predefined size of the intentional gap relative to the predefined distance between the first strip and the second strip, a first reluctance of the magnetic flux across the intentional gap in the first strip to be greater than a second reluctance of the magnetic flux across the predefined distance between the first strip and the second strip.

2. The wireless power-transfer structure as described in claim 1, wherein the intentional gap has a width of a magnitude that increases a reluctance of a flux path along the first strip and balances flux density between the first strip and the second strip.

3. The wireless power-transfer structure as described in claim 1, wherein the magnetic field is substantially perpendicular to the intentional gap.

4. The wireless power-transfer structure as described in claim 1, further comprising:
a rib disposed between the first strip and the second strip, wherein the rib is configured to provide structural rigidity to the plurality of ferrite strips.

5. The wireless power-transfer structure as described in claim 1, wherein one or more additional strips of the plurality of ferrite strips include additional intentional gaps having predefined sizes based on predefined distances between the one or more additional strips and a neighboring strip to the additional intentional gaps effective to balance reluctances of individual strips of the plurality of ferrite strips.

6. The wireless power-transfer structure as described in claim 1, wherein the first strip includes one or more additional intentional gaps.

7. The wireless power-transfer structure as described in claim 1, wherein the predefined size of the intentional gap is relatively larger than gaps due to manufacturing tolerances and material flaws associated with the first strip.

8. The wireless power-transfer structure as described in claim 1, further comprising:
a backplate;
an insulating layer connecting the plurality of ferrite strips to the backplate;
an additional insulating layer disposed between the plurality of ferrite strips and the one or more coils; and
a plurality of ribs connected to the backplate, each of the plurality of ribs disposed between a pair of strips of the plurality of ferrite strips.

9. The wireless power-transfer structure as described in claim 1, wherein the first strip is formed from a plurality of ferrite pieces, and wherein the intentional gap is disposed between a first ferrite piece of the plurality of ferrite pieces and a second ferrite piece of the plurality of ferrite pieces.

10. The wireless power-transfer structure as described in claim 1, wherein the predefined size of the intentional gap is based on a relationship with the predefined distance between the first strip and the second strip effective to cause the reluctance of the flux path along the first strip to be relatively less than an additional reluctance of an additional flux path across the predefined distance from the first strip to the second strip.

11. The wireless power-transfer structure as described in claim 1, wherein:
the plurality of ferrite strips includes a third strip adjacent to the second strip and spaced apart from the second strip by an additional predefined distance;
the second strip includes an additional intentional gap having an additional predefined size that is based on both the predefined distance between the first strip and the second strip and the additional predefined distance between the second strip and the third strip; and
the second strip includes the additional intentional gap to increase an additional reluctance of an additional flux path along the second strip and further balance the flux density between the first strip and the second strip and an additional flux density between the second strip and the third strip.

12. The wireless power-transfer structure as described in claim 1, wherein:
the one or more coils are arranged in a Double-D coil structure; and
the plurality of ferrite strips are arranged in a direction relative to a polarization between poles of the Double-D coil structure.

13. The wireless power-transfer structure as described in claim 1, wherein:
the one or more coils include a single circular coil topology; and the plurality of ferrite strips are arranged to extend lengthwise radially from a common point but spaced apart from the common point.

14. A wireless charging system comprising:
a backplate;
one or more coils configured to generate a magnetic field; and
a plurality of ferrite strips disposed between the backplate and the one or more coils, the plurality of ferrite strips configured to provide a path for magnetic flux induced by the magnetic field, the plurality of ferrite strips including at least a first strip and a second strip adjacent to the first strip, the first strip being spaced apart from the second strip by a predefined distance, the first strip including an intentional gap disposed at a high-flux-density area within the first strip, the intentional gap having a predefined size that is determined based on the predefined distance between the first strip and the second strip, the intentional gap at least partially balancing flux density between the first strip and the second strip by increasing a reluctance of a flux path along the first strip effective to cause a first reluctance of the magnetic flux across the predefined distance between the first strip and the second strip to be less than a second reluctance of the magnetic flux across the intentional gap in the first strip, the first strip including a longitudinal axis that is substantially perpendicular to the intentional gap.

15. The wireless charging system as described in claim 14, wherein the intentional gap is substantially perpendicular to the magnetic field.

16. The wireless charging system as described in claim 14, further comprising a rib disposed between the first strip and the second strip, the rib configured to provide structural rigidity to the plurality of ferrite strips.

17. The wireless charging system as described in claim 14, wherein one or more additional strips of the plurality of ferrite strips include additional intentional gaps having predefined sizes based on predefined distances between the one or more additional strips and a neighboring strip to the additional intentional gaps effective to balance reluctances of individual strips of the plurality of ferrite strips.

18. The wireless charging system as described in claim 14, wherein the predefined size of the intentional gap is larger than gaps due to manufacturing tolerances and material flaws in the first strip.

19. The wireless charging system as described in claim 14, further comprising:
an insulating layer connecting the plurality of ferrite strips to the backplate;
an additional insulating layer disposed between the plurality of ferrite strips and the one or more coils; and
a plurality of ribs connected to the backplate, wherein each of the plurality of ribs is disposed between a pair of strips of the plurality of ferrite strips.

20. The wireless charging system as described in claim 14, wherein the first strip is formed from a plurality of ferrite pieces, and wherein the intentional gap is disposed between two of the plurality of ferrite pieces.

21. A method comprising:
identifying a high-density flux area within a first strip of a plurality of ferrite strips of a power-transfer structure;
measuring a distance between the first strip and a second strip of the plurality of ferrite strips that is adjacent to the first strip;
determining a size of an intentional gap to be placed within the high-density flux area of the first strip based on the distance between the first strip and the second strip, wherein the intentional gap size is determined based on a target level of reluctance increase of a flux path along the first strip; and
building the power-transfer structure based on inclusion of the intentional gap in the high-density flux area within the first strip.

22. The method as described in claim 21, wherein the intentional gap is substantially perpendicular to the magnetic field.

23. The method as described in claim 21, further comprising inserting a rib between the first strip and the second strip to provide structural rigidity to the plurality of ferrite strips.

24. The method as described in claim 23, wherein the rib is connected to a backplate, and the backplate is attached to the plurality of ferrite strips.

25. The method as described in claim 21, wherein the size of the intentional gap is relatively larger than manufacturing tolerances and material flaws associated with the first strip.

26. The method as described in claim 21, wherein the size of the intentional gap is determined based on a relationship between the size of the intentional gap and the measured distance between the first strip and the second strip effective to cause the reluctance of the flux path along the first strip to be relatively less than an additional reluctance of an additional flux path from the first strip to the second strip.

27. The method as described in claim 21, further comprising:
connecting the plurality of ferrite strips to a backplate via an insulating layer; and
inserting each of a plurality of ribs between a pair of strips of the plurality of ferrite strips.

28. A wireless power-transfer apparatus comprising:
one or more coils configured to generate a magnetic field based on an electrical current;
a channeling means for channeling magnetic flux induced by the magnetic field, the channeling means including a pair of adjacent ferrite strips that are separated by a predefined distance; and
a balancing means for balancing magnetic flux density in the channeling means based on an increased reluctance of a path of the magnetic flux in a high-flux-density area, the balancing means including an intentional gap between two portions of a first strip of the pair of adjacent ferrite strips effective to cause a first reluctance of the magnetic flux across the predefined distance between the pair of adjacent ferrite strips to be less than a second reluctance of the magnetic flux across the intentional gap in the first strip, the channeling means having a longitudinal axis that is substantially perpendicular to the intentional gap.

29. The wireless power-transfer apparatus as described in claim 28, wherein:
the channeling means includes at least one ferrite strip; and
the intentional gap includes a width to increase the reluctance of the flux path along the at least one strip.

30. The wireless power-transfer apparatus as described in claim 28, further comprising means for providing structural rigidity to the channeling means.

* * * * *